US007397586B2

(12) United States Patent
Panini et al.

(10) Patent No.: US 7,397,586 B2
(45) Date of Patent: Jul. 8, 2008

(54) SCANNER APPARATUS FOR SCANNING BANK CHECKS AND OTHER PAPER DOCUMENTS

(75) Inventors: Ugo Panini, Turin (IT); Franco Bellotto, Turin (IT)

(73) Assignee: Panini S.p.A., Turin (IT)

( * ) Notice: Subject to any disclaimer, the term of this patent is extended or adjusted under 35 U.S.C. 154(b) by 592 days.

(21) Appl. No.: 10/774,334

(22) Filed: Feb. 6, 2004

(65) Prior Publication Data
US 2005/0041268 A1 Feb. 24, 2005

(30) Foreign Application Priority Data
Feb. 7, 2003 (IT) .......................... TO2003A0085

(51) Int. Cl.
*H04N 1/04* (2006.01)
(52) U.S. Cl. .................... 358/474; 358/496; 358/498
(58) Field of Classification Search .............. 358/496, 358/498, 474
See application file for complete search history.

(56) References Cited

U.S. PATENT DOCUMENTS

| 4,571,636 | A | * | 2/1986 | Itoh ........................... 358/482 |
| 4,734,760 | A | | 3/1988 | Futaki |
| 4,914,525 | A | * | 4/1990 | Abe et al. ................... 358/498 |
| 4,971,309 | A | * | 11/1990 | Reid-Green ................ 271/4.03 |
| 5,651,620 | A | * | 7/1997 | Paranjpe ................. 400/120.02 |
| 5,852,764 | A | * | 12/1998 | Kida et al. .................. 399/401 |
| 5,912,747 | A | * | 6/1999 | Murakami .................. 358/497 |
| 6,009,303 | A | * | 12/1999 | Kumagai et al. ............ 399/370 |
| 6,069,715 | A | * | 5/2000 | Wang .......................... 358/498 |
| 6,447,182 | B2 | * | 9/2002 | Brewington et al. ........ 400/188 |
| 6,628,433 | B1 | * | 9/2003 | Westcott et al. ............. 358/474 |
| 2002/0071702 | A1 | * | 6/2002 | Nose et al. .................. 399/374 |
| 2002/0195492 | A1 | * | 12/2002 | Murata et al. ............... 235/440 |
| 2003/0009420 | A1 | * | 1/2003 | Jones .......................... 705/39 |

FOREIGN PATENT DOCUMENTS

| DE | 298 14 558 U1 | 11/1998 |
| EP | 0 291 042 A2 | 11/1988 |
| EP | 0 461 622 A2 | 12/1991 |
| EP | 1 175 082 A2 | 1/2002 |
| GB | 2 251 110 A | 6/1992 |

* cited by examiner

*Primary Examiner*—Kimyen Vu
*Assistant Examiner*—Yogesh Paliwal
(74) *Attorney, Agent, or Firm*—Seed IP Law Group PLLC

(57) ABSTRACT

A scanner apparatus comprises a first device for scanning bank checks and a second device for scanning other paper documents. The first device includes a first input receptacle for receiving checks to be scanned, a first image-scanner unit for scanning a check, a first output receptacle for receiving the check after it has been scanned, and a first conveyor mechanism for conveying checks from the first input receptacle to the first output receptacle, passing in front of the first scanner unit. The second device includes a second input receptacle for receiving paper documents to be scanned, a second image-scanner unit for scanning a paper document, a second output receptacle for receiving the paper document after it has been scanned, and a second conveyor mechanism for conveying a paper document from the second input receptacle to the second output receptacle, passing in front of the second scanner unit.

12 Claims, 4 Drawing Sheets

SCANNER APPARATUS FOR SCANNING BANK CHECKS AND OTHER PAPER DOCUMENTS

The present invention relates to a scanner apparatus for scanning bank checks and other paper documents, particularly documents in formats other than check format. The apparatus is intended for use particularly advantageously at a bank counter for scanning checks, payment receipts, and various documents.

Currently, there are known types of scanner apparatus for scanning bank checks which comprise an input receptacle for receiving one or more checks to be scanned. The apparatus comprises a conveyor mechanism for conveying the checks, one at a time, from the input receptacle to an output receptacle, passing in front of an image-scanner unit for scanning one or both faces of the check.

The present invention proposes the provision of an apparatus having the characteristics set out in claim 1, which can scan both bank checks and paper documents of different formats, such as for example, paying-in slips or other documents which may relate to people, to current accounts, or to banking operations having some correlation with the checks paid in.

Figure 1:
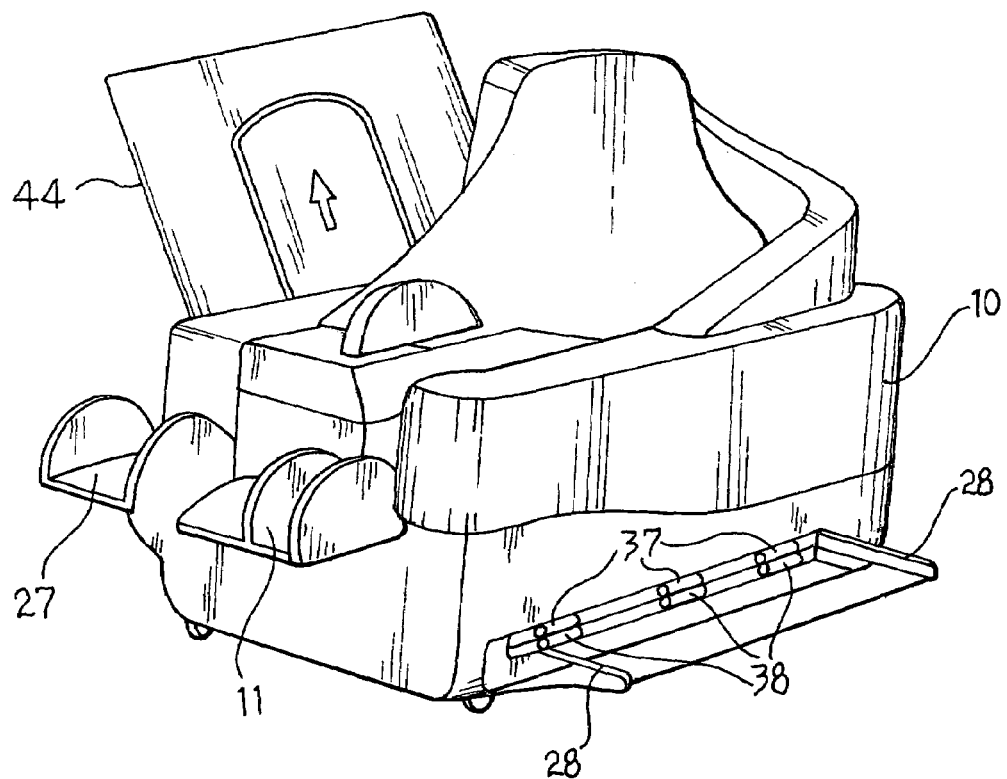
Figure 2:
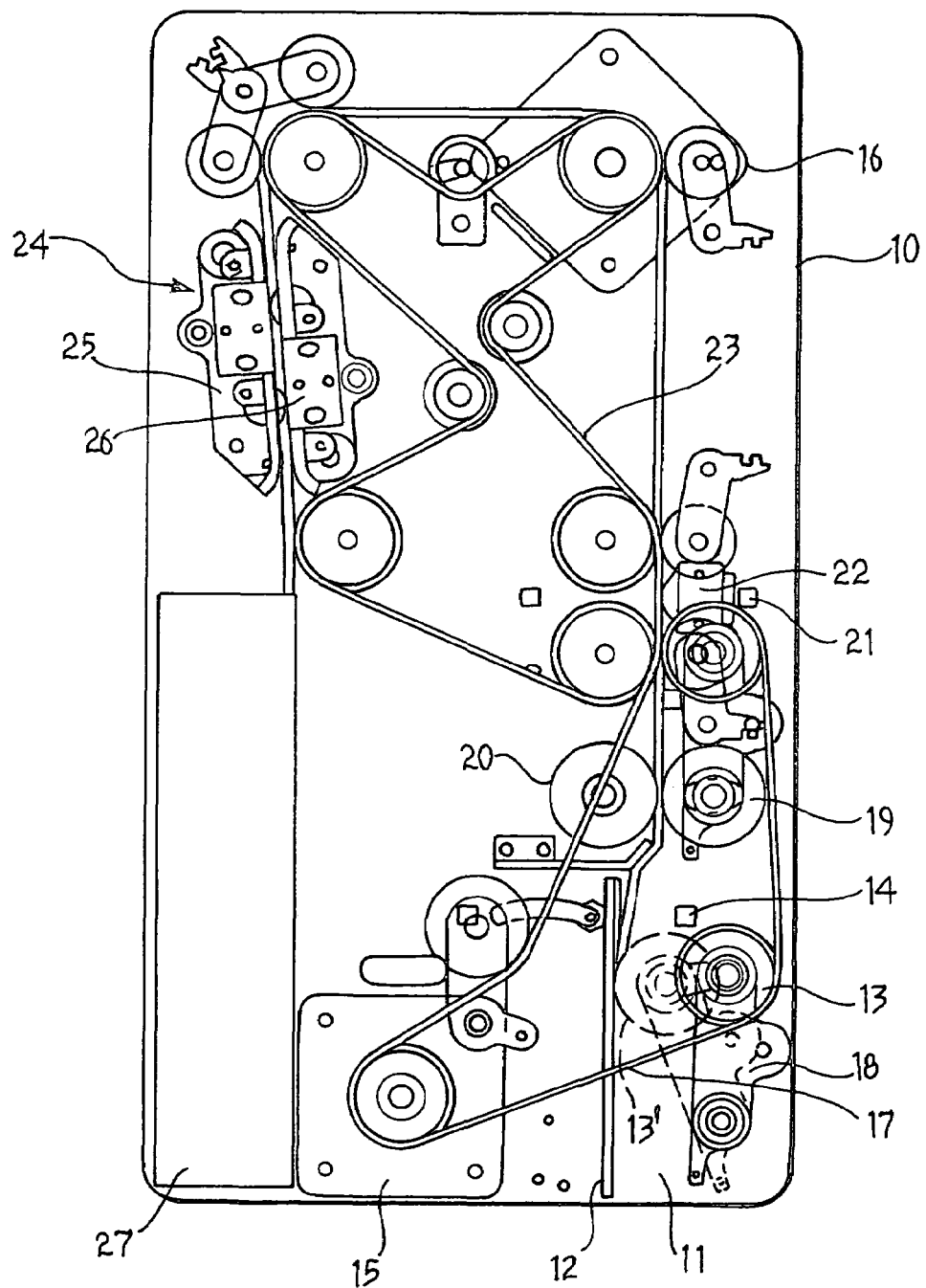
Figure 3:
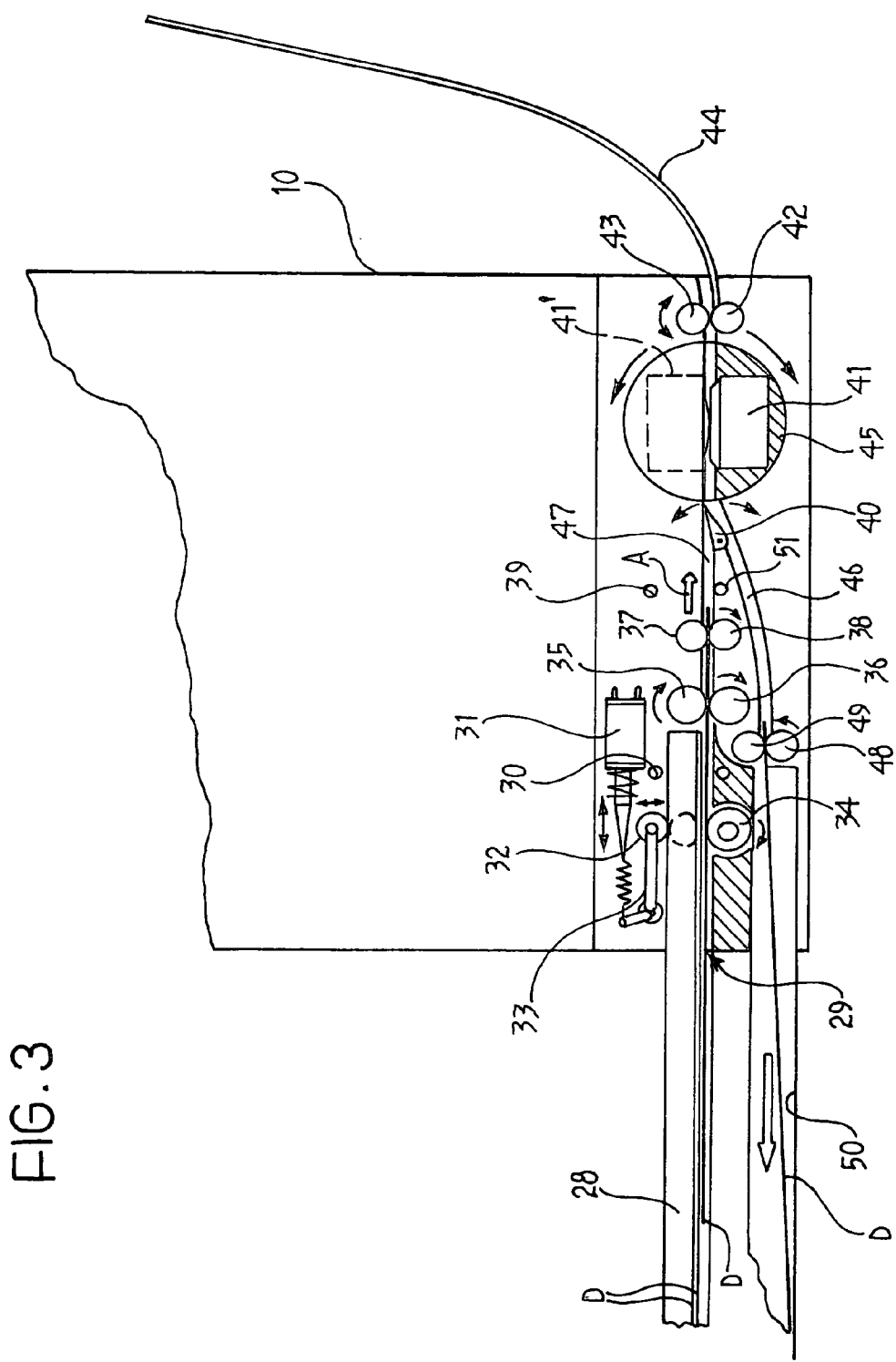
Figure 4:
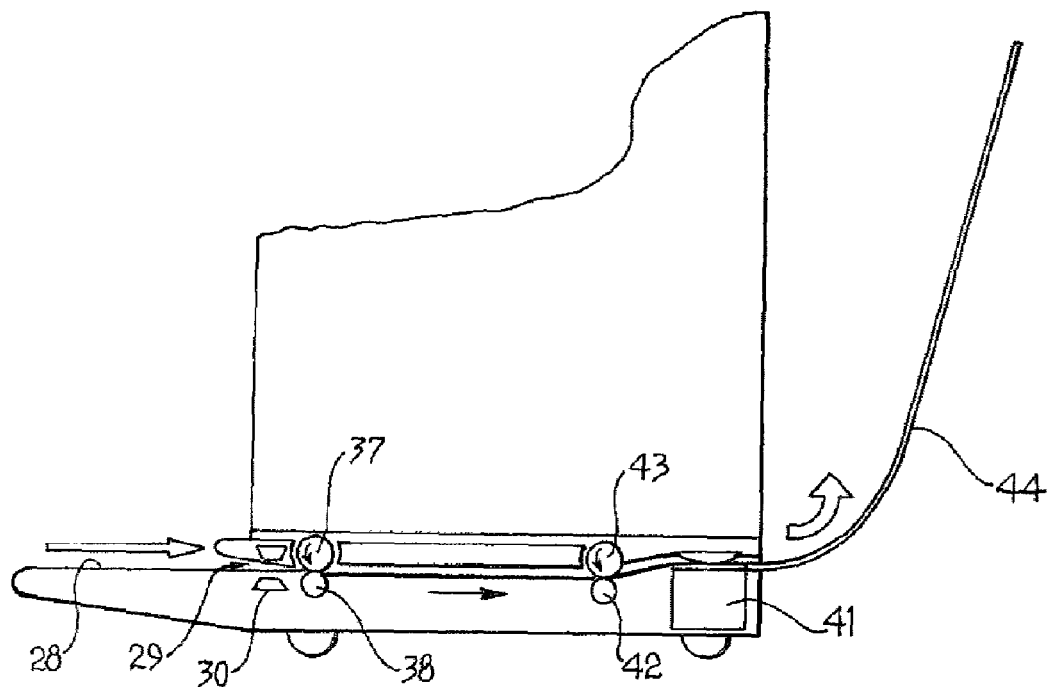
Figure 5:
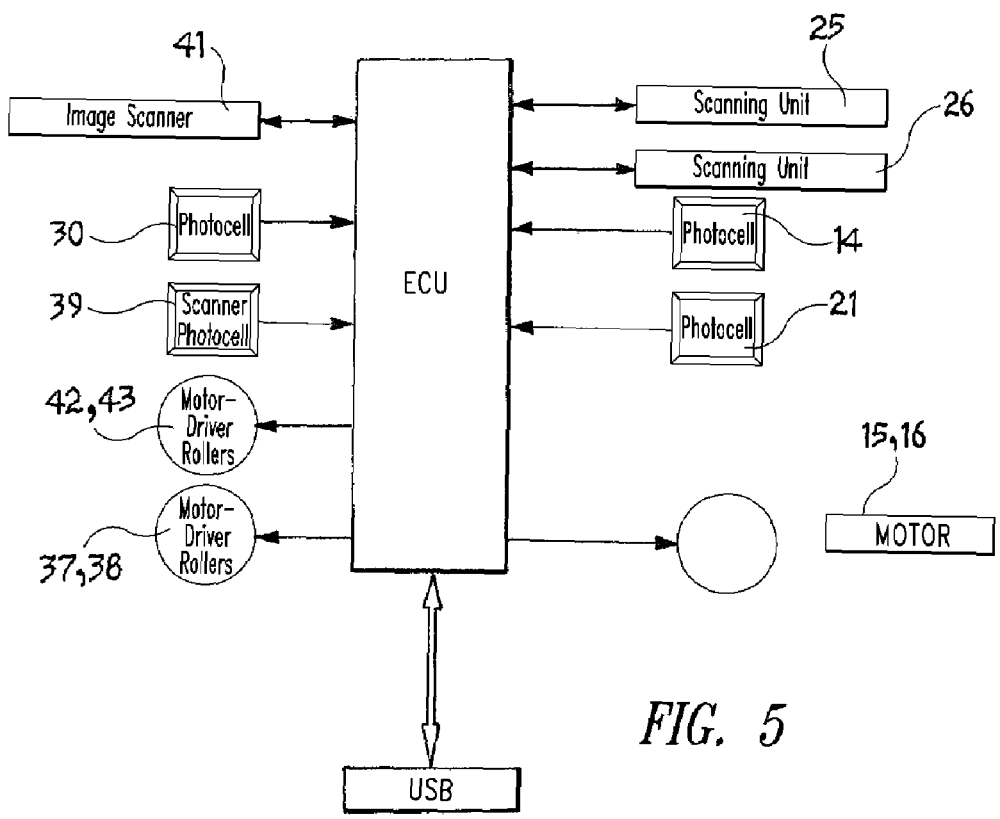

Some preferred but non-limiting embodiments of the invention will now be described with reference to the appended drawings, in which:

FIG. 1 is an overall perspective view of an apparatus according to the invention, FIG. 2 is a plan view of a check-scanning device forming part of the apparatus of FIG. 1, FIG. 3 is a vertical section through a device, incorporated in the apparatus, for scanning other paper documents, FIG. 4 is a vertical section through an alternative embodiment of the device for scanning other paper documents, FIG. 5 is a block diagram which shows the functional relationships between various components of the devices of the apparatus.

A scanner apparatus according to the invention comprises (FIG. 1) an outer casing 10 in the upper portion of which there is a device for scanning checks, whereas the lower portion houses a device for scanning paper documents of other types.

The device for scanning checks is shown schematically in FIG. 2. One or more checks (not shown) are arranged vertically in an input receptacle 11 in which there is a feed plate 12 which urges the checks towards a pick-up and feed roller 13. A first photocell 14 detects the presence of a check in the input receptacle 11 and, by means of an electronic control unit ECU, (shown schematically solely in FIG. 5), activates a first motor 15 for picking up the check and a second motor 16 for moving the check forwards. Once the first motor 15 has been activated, it sets the feed roller 13-in motion by means of a transmission belt 17. The roller 13 is mounted on a lever 18 which is moved towards the checks, from the position shown in solid outline to the position 13' shown in broken outline and, by rotating, causes one or more checks to move towards a pair of motor-driven separator rollers 19, 20. The separator roller 20, which is contrarotatory relative to the roller 19, separates the checks, allowing only the check that is disposed farthest to the right (with reference to FIG. 2) to move forwards and pushing back the others. When the check which moves forwards passes in front of a second photocell 21 and obscures it, a head 22 for reading magnetic characters printed on the front of the check, for example, a conventional electromagnetic induction head of the E13B/CMC7 type, is activated. The magnetic head 22 is deactivated automatically by means of the photocell 21 when the tail-end of the check passes beyond that photocell. When the same photocell 21 is obscured, it also causes the motor 15 for picking up the checks to stop in order to space out the passing of the various checks and to prevent them from being supplied consecutively, closely following one another without gaps.

The second motor 16 moves the check forwards, by means of a second toothed feed belt 23, from the reading region of the magnetic head 22 to a scanner device 24 where the check passes between a pair of substantially symmetrical image-scanning units 25, 26 each provided with a CIS (compact image sensor) optical sensor for scanning both faces (front and rear) of the check. Both the magnetic head 22 and the scanner device, 24 are known in the art and do not need to be described in detail herein.

Finally, the check is deposited in an output receptacle 27.

An important characteristic of the solution according to the present invention is that the same apparatus comprises a device for scanning other paper documents, advantageously also documents in A4 format.

A first embodiment of the device for scanning paper documents other than checks is shown schematically in FIG. 3. One or more documents D, in this example, documents of A4 format, are deposited horizontally in an input receptacle 28 in the form of a tray which projects from a horizontal input slot 29 formed in the lower portion of the outer casing 10 on the side defined herein as the "front". The slot 29 preferably has a width (in the direction perpendicular to the direction of introduction of the documents D) greater than 210 mm to permit the introduction and scanning of documents in A4 format. The documents D are introduced into the slot 29 manually until they reach the region of a photocell 30 which detects the presence of a document to be scanned. The photocell 30 brings about activation of an electromagnetic actuator 31 which moves a pressure roller 32 mounted on a lever 33 towards a motor-driven roller 34 for picking up the document. The document D, which is lower down, is urged into contact with the motor-driven roller 34 and is moved in the direction indicated by the arrow A, passing between a pair of contrarotating separator rollers 35, 36 which allow only one document to move forwards at a time. The document is then engaged by a first pair of motor-driven rollers 37, 38 which impart a constant speed of advance to the document. The document passes in front of a scanner photocell 39 which, when it is obscured by the document, deactivates the electromagnetic actuator 31. The document moves forwards, over a deflector or switch 40 associated with a biasing spring (not shown) which urges the deflector in the clockwise direction indicated in the drawing. The document then passes beside an image scanner 41 provided with a CIS optical sensor for scanning one of the faces of the document. For this purpose, either a 210 mm CIS sensor arranged transverse the direction of movement of the documents so as to cover substantially the entire width of a sheet in A4 format or, alternatively, two 105 mm CIS sensors aligned transversely and connected to one another in cascade in accordance with methods known to persons skilled in the art, may equally well be used.

When the document has passed the image scanner 41, it is picked up by a second pair of motor-driven rollers 42, 43 and reaches an output receptacle, defined by a collecting tray 44, on the "rear" side of the casing 10.

In the preferred embodiment shown in FIG. 3, the device D for scanning paper documents is arranged selectively to scan a single face or both faces (front and rear) of the document. The desired operative mode is selected by the user by means of a selection button (not shown).

For front/rear scanning, the scanner 41 is mounted on a carousel 45 rotatable about an axis perpendicular to the path of movement of the document and the second pair of motor-driven rollers 42, 43 can be operated in order to rotate in the opposite direction to that which discharges the document onto the rear output receptacle 44.

Front/rear scanning takes place as follows.

The scanner photocell 39 is connected to an electronic control unit ECU (FIG. 5) which is arranged automatically to bring about reversal of the drive of the motor-driven rollers 42, 43 and rotation of the carousel 45 through 180° when a predetermined period of time has elapsed after the moment at which the tail-end of the document D passed the scanner photocell 39. The two above-mentioned commands are imparted after a period of time such that the document has completely passed the scanner 41 but is still engaged between the rollers 42, 43. The rotation of the carousel 45 through 180° causes the scanner 41 to be situated on the opposite side of the path of movement of the document in order to face the other face (the rear side) to be scanned, as indicated 41'. By rotating in the opposite direction, the rollers 42, 43 cause the document to move backwards along its path, passing beside the scanner 41 (which will now be situated in the position 41' shown in broken outline in FIG. 3). When the document comes up against the deflector 40, it is guided along a deflected path 46 disposed beneath the path 47 followed by the document during the scanning of its front face. A third pair of motor-driven rollers 48, 49 is disposed on the deflected path 46 and conveys the document into a front output receptacle 50 disposed beneath the input receptacle 28.

When the document passes beyond the photocell 39 along the, deflected path. 46 towards the output receptacle 50, the control unit ECU automatically brings about, a further rotation of the carousel 45 through 180°, thus bringing the scanner 41 back to the position shown in solid outline. The apparatus is thus ready to scan a new document and to repeat the above-described sequence of operations. If no further documents to be scanned are in the input receptacle, the apparatus is automatically put in a stand-by condition. Naturally, if operation solely for the front face of a document is selected, the carousel 45 will not be rotated from the position shown in solid outline.

FIG. 4 shows schematically an alternative and simplified embodiment of the device for scanning paper documents other than checks. In the variant of FIG. 4, a document, for example in A4 format, is deposited horizontally in a front input receptacle 28 defined by a tray which projects externally from a horizontal input slot 29 situated in the lower portion of the apparatus. The documents are introduced into the slot 29 manually one at a time until a photocell 30 is obscured. The obscuring of the photocell 30 brings about the rotation of a first and of a second pair of motor-driven rollers 37, 38 and 42, 43 which pull the document forwards in the direction indicated by the arrow. The document thus passes over an image scanner 41 provided with a CIS optical sensor for scanning one of the faces of the document and reaches a rear output receptacle or tray 44. The movement of the conveyor rollers 37, 38 and 42, 43 is stopped automatically a predetermined period of time after the document has passed beyond the photocell 30.

The electronic control unit ECU supervises the operation of the apparatus as a whole and hence also the operation of all of the drive/actuator members and optical/electronic devices described above, as illustrated in the block diagram of FIG. 5.

In particular, it will be appreciated that the apparatus of the invention uses:

a single electronic control unit which controls the movement of all of the drive/actuator members both of the device for scanning checks and of the device for scanning other paper documents; the same unit ECU is also operatively connected to all of the photocells and the scanning means of both of the above-mentioned devices in order to receive therefrom the signals relating to the scanning of the checks and of the paper documents D;

one single USB2-USB1 (universal serial bus) or Ethernet serial communication bus for transmitting the scanning data to a personal computer (PC) or to an external network, and a single electrical supply.

In other words, the apparatus according to the invention is a multifunctional apparatus that incorporates within it the functions which up to now have been performed by two different sets of apparatus. Instead, the apparatus of the present invention permits a considerable saving in costs and space since the control of the movement members of the two scanning devices, the control of the optical/electronic devices of both of the devices, and the transmission of the data detected by both of the devices are entrusted to a single processing unit and to a single communication bus which are common to both devices.

The information obtained by the two scanning devices of the apparatus can advantageously be managed by the PC which receives it in a manner such as to associate it and store it in a common file or in any case to "centralize" it in a suitable manner, according to the requirements of the user, for example, a bank. Naturally, reference to this possible field of application of the invention should not be interpreted in any way as limiting of the scope of the patent.

The invention is not intended to be limited to the embodiments described and illustrated herein, which should be considered as examples of embodiments of the apparatus; rather, the invention may be modified with regard to the form and arrangement of parts and to the details of construction and of operation. For example, image scanners arranged in pairs may be used on the paths followed by the documents inside the apparatus, for substantially simultaneous scanning of both faces (front and rear) of a document, as shown in FIG. 2 in which a pair of scanners 25, 26 is provided for scanning both faces of a check.

What is claimed is:

1. A scanner apparatus for scanning paper documents, of the type comprising a first device for scanning bank checks, wherein the first device includes:

a first input receptacle for receiving at least one check to be scanned, the check includind a front face and a rear face;

at least one first image-scanner unit for scanning at least one of the faces of the check, a first output receptacle for receiving the check after it has been scanned by the first scanner unit, and a first conveyor mechanism for conveying checks, one at a time, from the first input receptacle to the first output receptacle, passing in front of the first scanner unit; and the apparatus further comprising a second device for scanning other paper documents, wherein the second device includes:

a second input receptacle for receiving at least one paper document to be scanned, the paper document including a front face and a rear face, at least one second image-scanner unit for scanning at least one of the faces of the paper document, at least one second output receptacle for receiving the paper document after it has been scanned by the second scanner unit, and a second conveyor mechanism for conveying paper documents, one at a time, from the second input receptacle to the second output receptacle, passing in front of the second scanner unit;

the scanner apparatus being characterized in that;

the second image-scanner unit is mounted so as to be rotatable about an axis perpendiccular to a path of movement of the paper document in order to be able to adopt a first angular position in which the second image-scanner unit is situated on one side of the path of movement in order to scan one face of the paper document and a second angular position to which the second image-scanner unit is rotated from the first angular position and in which the second image-scanner unit is situated on an opposite side of the path of movement in order to scan the other face of the document, and the second conveyor mechanism comprises a pair of motor-driven rollers which are adapted to be rotated selectively and alternatively in two opposite directions of rotation in order to move the paper document in a first direction or in a second direction opposite the first direction.

2. The scanner apparatus according to claim 1, further comprising an outer casing containing the first scanning device and the second scanning device, and for the second input receptacle, the outer casing has an input slot for the said paper documents which has a width of at least 210 mm.

3. The scanner apparatus according to claim 1, further comprising an electronic control unit which is connected to the first image-scanner unit of the first device in order to receive signals relating to the scanning of checks from the first unit, and to the second image-scanner unit in order to receive signals relating to the scanning of the other paper documents from the second unit.

4. The scanner apparatus according to claim 3, wherein the electronic control unit is also operatively connected to:
   first photocell means for detecting the presence of at least one check in the first input receptacle of the first scanning device,
   drive/actuator means of the first conveyor mechanism for picking up at least one check from the first input receptacle and conveying the check first output receptacle, passing in front of the first scanning unit;
   second photocell means for detecting the presence of at least one document in the second input receptacle of the second scanning device, and
   drive/actuator means of the second conveyor mechanism for picking up at least one document from the second input receptacle and conveying the document to a second output receptacle, passing in front of the second scanner unit.

5. The scanner apparatus according to claim 3, further comprising one single USB or Ethernet serial communication bus operatively connected to the electronic control unit in order to transmit to the exterior the scanning data coming from all of the scanner units of the apparatus.

6. The scanner apparatus according to claim 1, wherein the second device for scanning paper documents is housed in the lower portion of the casing and in that the first scanning device is disposed in the upper portion of the casing.

7. The scanner apparatus according to claim 1, wherein the second scanning device comprises an input receptacle for paper documents, situated on a first side of the casing, and an output receptacle disposed on a second side of the casing opposite the first side.

8. The scanner apparatus according to claim 7 wherein the second scanning device comprises a further output receptacle situated on the first side of the casing.

9. The scanner apparatus according to claim 1 wherein the second device for scanning paper documents is arranged selectively to perform scanning of only one face or of both faces of the document.

10. The scanner apparatus according to claim 1 wherein the second, rotatable scanner unit is interposed between the pair of motor-driven rollers and a deflector means which can permit the movement of a document from the second input receptacle to the second scanner unit along a first path and can deflect the document along a deflected path towards a further output receptacle when the document is moving in said opposite direction.

11. A scanner apparatus comprising:
   an imput receptacle configured to receive at least one document to be scanned, the document including a front face and a rear face;
   an image-scanner unit configured to scan a face of the document;
   an output receptacle configured to receive the paper document after it has been scanned by the scanner unit; and
   a conveyor mechanism configured to convey to convey papeer documents, one at a time, from the imput receptable to the output receptable, passing in front of the scanner unit, wherein
   the image-scanner unit is mounted so as to be rotatable about an axis perpendicular to a path of movement of the document in order to be able to adopt a first angular position in which the image-scanner is situated on a first side of the path pf movement in order to scan a first face of the document and a second angular position to which the image-scanner unit is rotated from the first angular position and in which the image-scanner unit is situated on a second side of the path of movement, opposed to the first side, in order to scan face of the document, opposed to the first face; and
   the conveyor mechanism comprises a pair of motor-driven rollers which are adapted to be rotated selectively and alternatively in two opposite direction of rotation in order to move the paper document in a first direction or in a second direction opposite the first direction along the path of movement.

12. The scanner apparatus according to claim 11, further comprising:
   a check input receptacle configured to receive at least one check to be scanned, the check including a front face and a rear face;
   at least one check image-scanner unit configured to scan at least one of the faces of the check,
   a check output receptacle configured to receive the check after it has been scanned by first scanner unit, and
   a conveyor mechanism configured to convey checks, one at a time, from the check input receptacle to the check output receptacle, passing in front of the check scanner unit.

* * * * *